United States Patent [19]

Raidel

[11] 4,093,272
[45] June 6, 1978

[54] UNITARY LIFT AND SPRING VEHICULAR SUSPENSION

[76] Inventor: John E. Raidel, Rte. 9, Box 400-M, Springfield, Mo. 65804

[21] Appl. No.: 732,874

[22] Filed: Oct. 15, 1976

[51] Int. Cl.² .............................................. B60G 11/10
[52] U.S. Cl. ................................. 280/686; 267/15 R; 267/52; 280/718
[58] Field of Search ............... 280/679, 709, 704, 715, 280/718, 662, 669, 686, 711; 267/15 R, 31, 52; 180/24.01, 24.02

[56] References Cited

U.S. PATENT DOCUMENTS

| | | | |
|---|---|---|---|
| 3,390,895 | 7/1968 | Verdi | 280/704 |
| 3,614,123 | 10/1971 | Raidel | 280/686 |
| 3,912,294 | 10/1975 | Raidel | 280/679 |

Primary Examiner—Joseph F. Peters, Jr.
Assistant Examiner—John A. Carroll
Attorney, Agent, or Firm—Rogers, Eilers & Howell

[57] ABSTRACT

An axle suspension with a unitary bracket attachable to a vehicle frame, the bracket having three sets of depending rails, between the first two of which a torque beam is pivoted with members at its other end for connection to an axle, and between the second and third rail sets a lift beam is pivoted to lie alongside the torque beam, the lift beam having members for connection to the axle; a hydraulic piston motor connected between the bracket and the lift beam; and a leaf spring bearing at one of its ends on the axle opposite to the piston motor; bearing at its middle on the bracket to receive vehicle load, and shackle members for supporting its other end.

12 Claims, 9 Drawing Figures

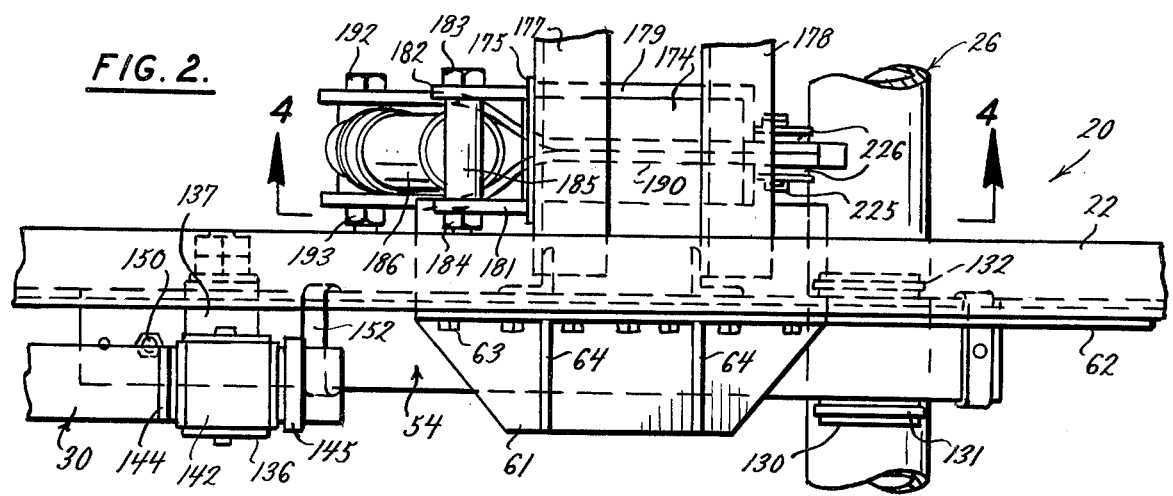
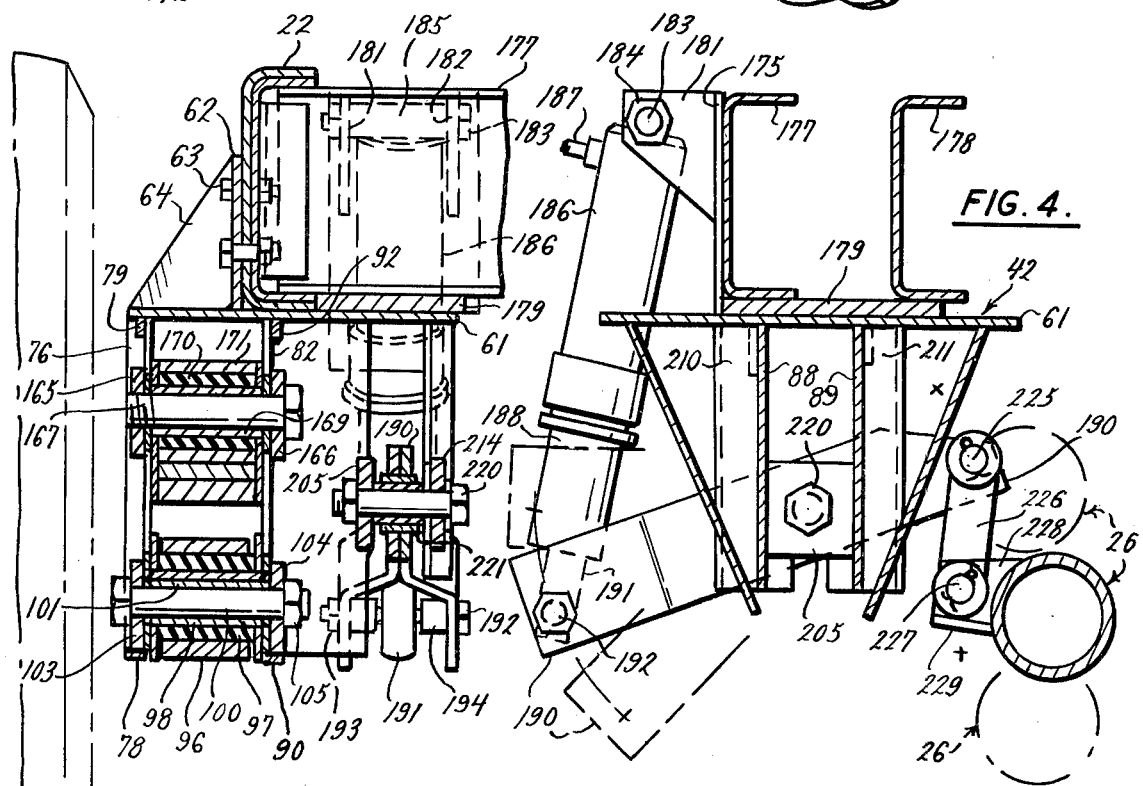
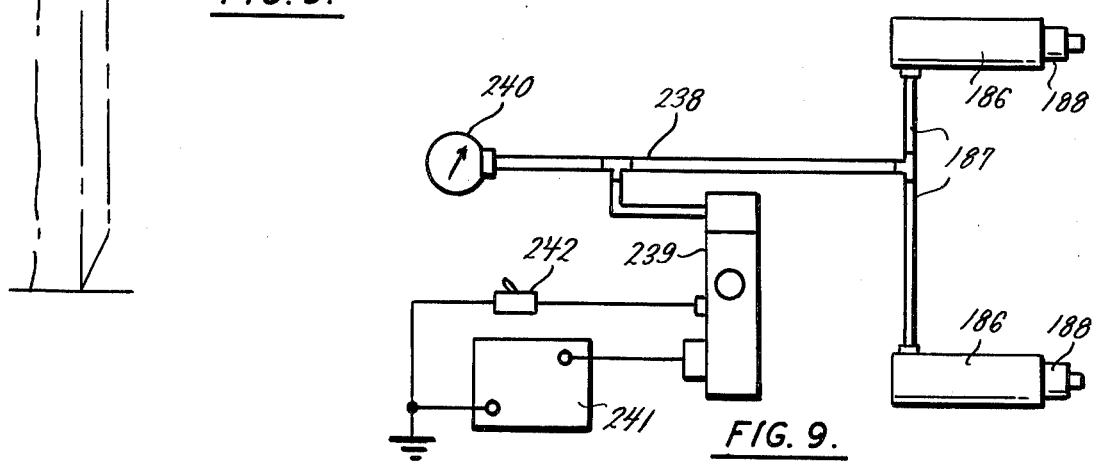

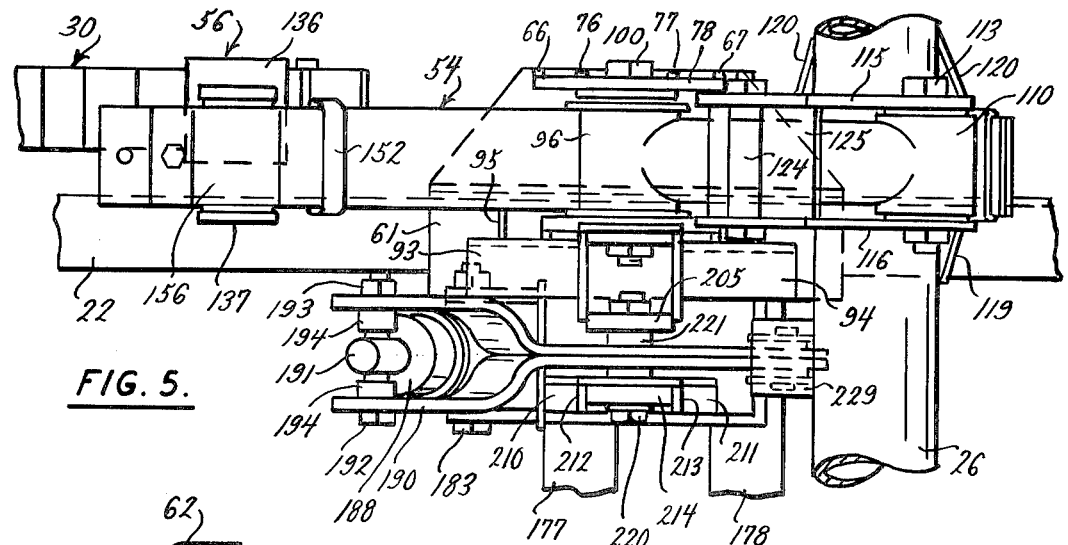
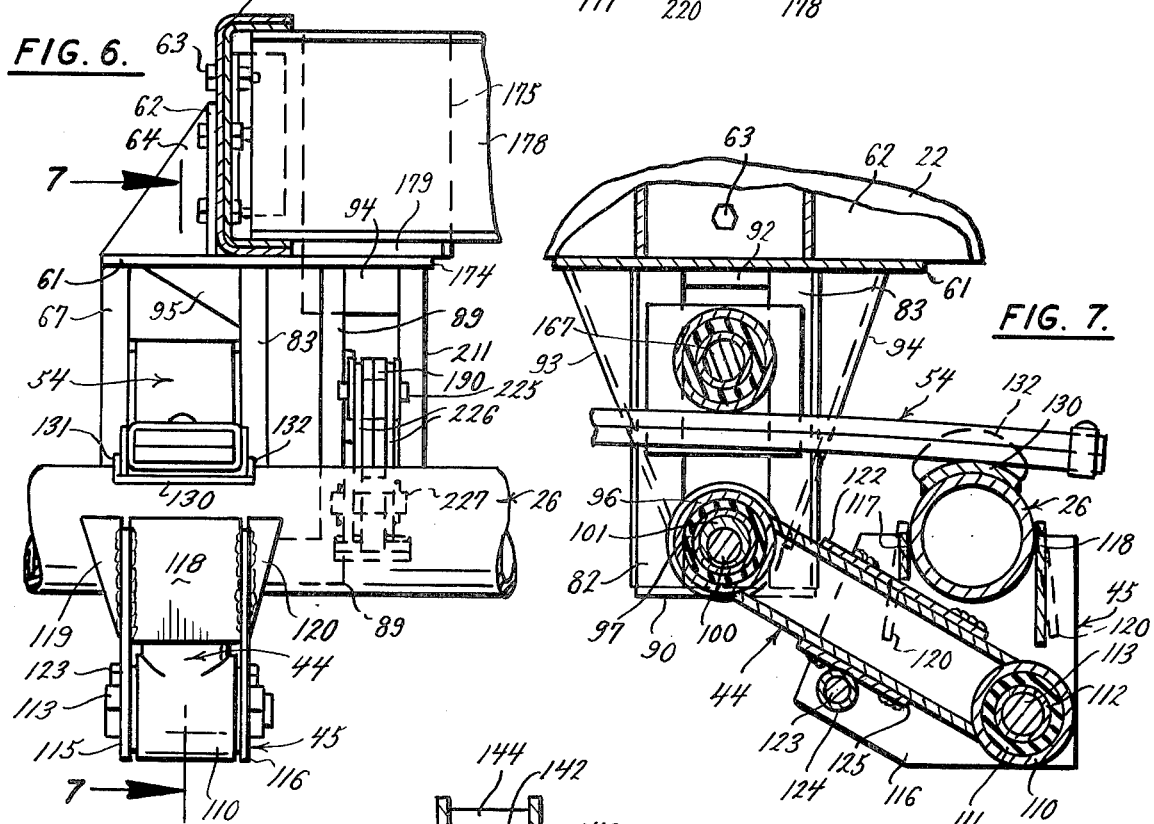
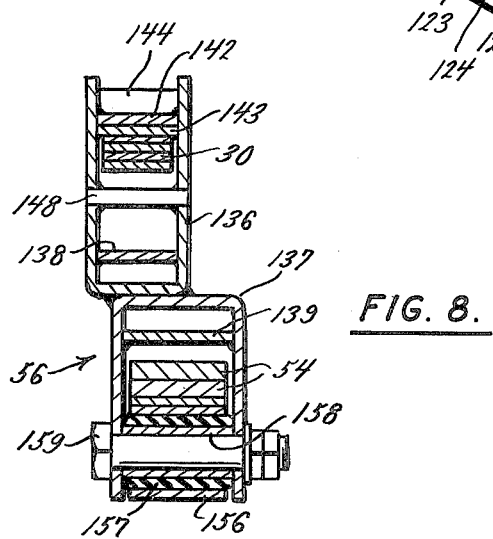

UNITARY LIFT AND SPRING VEHICULAR SUSPENSION

BACKGROUND OF THE INVENTION

The invention is especially, though not necessarily, used on a tag axle assembly. The torque beam arrangement and the lift beam arrangement taken separately are generally similar to such arrangements in prior art. One of each was attached on each side of the vehicle.

Formerly the torque beam arrangement and lift beam arrangement had to be separately handled and separately mounted on the vehicle. This involved welding and drilling for the lift beam underneath the vehicle and some distance inside the location for the torque beam. The hydraulic connections had to be conducted to well under the vehicle.

In the old set-up, the torque beam arrangement was separately attached outside the lift beam arrangement, they being handled separately, drilled and welded separately, and maintained far enough apart to enable them to be applied and worked upon.

With the present arrangement, only a single bracket requiring only a single operation of drilling and welding for attachment to the vehicle, is required. This saves material and labor. The installation can largely be done without having to work underneath the vehicle.

The means depending from the bracket to receive the torque beam and the lift beam are side by side, so that three depending sets can take the two beams, instead of two sets for each beam. The parts are designed so that each beam structure is accessible for servicing. The compact arrangement adds strength to the suspension. Also by having the beams side-by-side, instead of one below the other, road clearance is improved.

The hydraulic motor in this suspension is given good road clearance, and yet can be serviced from beside the vehicle. The design affords ample piston stroke.

A valuable feature is that the suspension can be sold as a kit to be mounted on a vehicle. The kit can comprise the unitary bracket means for both beams, the axle connections for both beams, and the hydraulic motor, all in one sub-assembly. The spring and shackle can be a second sub-assembly, and the controls a third. This simplifies the mounting of the suspension.

Other features will appear from the following.

DESCRIPTION OF THE DRAWINGS

FIG. 2 is a top plan view of the suspension assembly of FIG. 1;

FIG. 3 is a vertical transverse section of the trailing axle suspension on the line 3—3 midway of FIG. 1;

FIG. 4 is a longitudinal sectional view taken on the line 4—4 of FIG. 2, schematically showing positions of the hydraulic mechanism and trailing axle;

FIG. 5 is a bottom view;

FIG. 6 is a rear elevation of the suspension;

FIG. 7 is a partial longitudinal vertical section on the line 7—7 of FIG. 6;

FIG. 8 is a vertical transverse section on the line 8—8 of FIG. 1; and

FIG. 9 is a wiring and hydraulic diagram for the suspension.

DETAILED DESCRIPTION OF PREFERRED EMBODIMENTS

Figure 1:
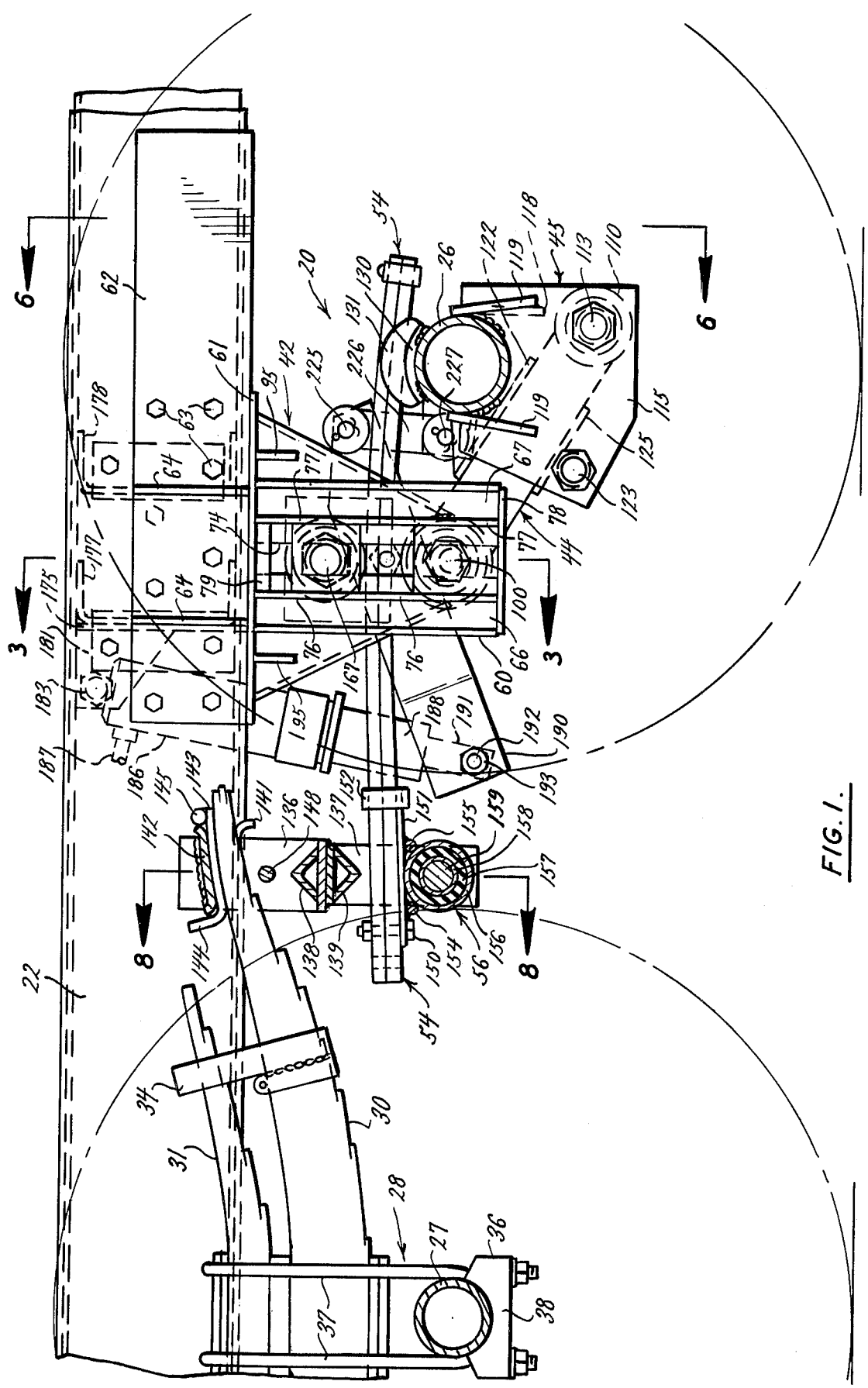
FIG. 1 is a side elevation of a vehicle suspension assembly of this invention as used on a trailing axle.

The present suspension is particularly useful for a tag or trailing axle of a vehicle such as a highway truck, but it is also useful for driving axles and for other applications, as will be understood. The description will be of an application to a tag axle.

Referring generally to FIGS. 1 and 2 of the drawing, there is shown a suspension assembly 20 of this invention mounted onto a side frame 22 of a vehicle chassis. The trailing axle 26 of the vehicle is mounted on the suspension assembly 20 below the frame, and the forward axle 27 (usually housing a driving axle) of the vehicle is mounted on a suspension assembly 28 below the frame 22, in a manner to be described. Forward and trailwheels are schematically indicated in FIGS. 1 and 3.

It is to be understood that the suspension assemblies 20 and 28 are duplicated on both sides of the chassis with the axles 26 and 27 similarly connected to both assemblies. Therefore, only the left side assemblies will be described, so that in viewing FIG. 2, forward motion of the vehicle is to the left.

The forward axle suspension assembly 28 will only be generally described since it is of a type commonly known in the art. It includes parallel leaf springs 30 and 31 with the leaf spring 31 being somewhat smaller and shorter, and located above the leaf spring 30. The rear end of the leaf spring 31 is attached in spaced relation to the leaf spring 30 by means of a shackle assembly 34. The rear end of the leaf spring 30 is mounted in a manner to be hereinafter described.

The forward axle 27 is mounted to the leaf springs 30 and 31 at their centers by means of an axle bracket 36 including U-bolts 37 which fit over the top of the spring 31 and downwardly through an axle saddle 38 in a manner commonly known in the art.

The forward end of the spring 31 is similarly mounted onto the spring 30 by means of another shackle member similar to the shackle 34, and the forward end of the spring 30 is pivotally mounted on the chassis in a commonly known manner, such as by means of a suitable hanger as shown in U.S. Pat. No. 3,614,123.

The principal components of the axle suspension assembly 20 are a hanger assembly 42 suspended from the frame member 22, a torque beam 44 having one end pivotally connected to the hanger assembly and its other end connected to an axle mounting bracket 45, the axle mounted onto the axle bracket 45 above the torque beam 44, and a leaf spring 54. The forward end of the leaf spring extends through a shackle assembly 56 forward of the hanger assembly 42, through the hanger assembly 42, and has its rear end bearing downwardly on the axle 26 back of the hanger assembly 42, as will be more fully described.

The hanger assembly 42 includes a hanger bracket 60, comprising a horizontal plate 61 lying beneath the frame 22, and a vertical plate 62 mounted adjacent the face of the vehicle frame 22 and bolted thereto at 63, the plates 61 and 62 being welded together. Triangular gussets 64 are welded between the horizontal plate 61 and the vertical plate 62 for reinforcement and rigidity. The foregoing parts of the hanger assembly typify primary parts thereof that are attached to the vehicle frame and that support depending portions for purposes to be described.

The hanger bracket 60 supports a load bearing assembly, that depends from the horizontal bracket plate 61. The outside components of the hanger bracket comprise two flanged, vertical rails 66 and 67, the upper ends of which are welded to the underside of the plate 61, and the flanges of which are turned outwardly.

The vertical members have their longitudinal plate portions coplanar but separated by a slot 74. Reinforcing ribs 76 and 77 are vertically welded to the plates 68 and 71 respectively, to be parallel to the transverse flanges of those rails, and spaced somewhat from the slot 74. A strap 78 is welded across the bottom of the vertical rails. Another reinforcing bar 79 is welded across the top of the slot 74.

The inside components of this hanger assembly are modified mirror images of the foregoing. Two angle rails 82 and 83 depend from and are welded to the horizontal plate 61. Their transverse flanges extend inwardly. Vertical ribs 88 and 89, wider than the flanges, are welded to the inside surfaces of the rails and to the horizontal plate 61, and a strap 90 is welded across the bottom of the flanges and ribs. A bar 92 is welded across the top thereof. The wide vertical ribs 88 and 89 extend inwardly for a purpose to appear.

Inwardly of the rails 82 and 83 is bracing to give rigidity to the hanger assembly. Back of the flanges on the rails 82 and 83 are two angular, flanged braces 93 and 94 with their flanges extending inwardly. These braces abut the inwardly extending flanges on the rails 82 and 83, as illustrated in FIG. 6. They are welded to the underside of the horizontal plate 61, and at their lower ends to the ribs 88 and 89. Gussets 95 are welded to the plate 61 and to the faces of the braces 93 and 94 to reinforce the assembly.

The foregoing hanger assemblies including the primary parts previously identified, and the parts depending therefrom, which may be designated as first depending portions, provide spaced supports for the torque bar 44. As will appear, they also connect the assembly with the leaf spring 54.

FIG. 3 shows that the torque bar 44 has a cylindrical crosshead 96 at its forward end. This surrounds a rubber or other elastic, cylindrical bushing 97 that in turn surrounds a bearing sleeve 98 mounted on a bolt type pivot 100. The bolt 100 includes an eccentric portion 101 integral with the bolt 100 and both are rotatably mounted within the sleeve 98, so that, as will appear, rotation of the bolt 100 will cause displacement of the eccentric 101, and adjustment of the crosshead. The purpose of this is explained in this inventor's prior U.S. Pat. No. 3,912,294. Since there is such a mounting for each end of the axle on the opposite sides of the vehicle, it can be seen that this adjustment is a means for causing both axles to have the same relationship to the ground and to the vehicle.

The bolt 100 passes through an outside clamping plate 103 that is welded to the outside of the two rails 66 and 67 between the ribs 76 and 77 at their lower ends. The bolt also passes through a clamping plate 104 similarly mounted on the inside between the inner rails 82 and 83 between the rib plates 88 and 89. A lock nut 105 is applied to the bolt 100 on the inner side and locks it into adjusted position. This nut 105 is accessible to a socket wrench or end wrench.

The torque bar 44 has another crosshead 110 at its rear end. This crosshead receives the cylindrical elastic bushing 111 of rubber or the like, that in turn surrounds a cylindrical sleeve 112 that is mounted on a bolt 113. This bolt is supported in the lower beam assembly 45.

This lower beam assembly comprises an outer plate 115 spaced from an inner plate 116 to receive the bolt 113 and the crosshead 110. The two plates are joined by cross plates 117 and 118 welded to them, and are recessed to receive and be welded to the tag axle 26. Gusset reinforcements 119 and 120, as shown in FIGS. 1 and 6, are welded to the plates 115 and 116 and to the tag axle 26.

The torque arm 44 is confined with respect to the lower beam assembly 45. For this purpose there is a plate 122 welded between the two vertical plates 115 and 116 and overlying the torque beam. Below the torque beam there is a bolt 123 that is mounted between the two plates 115 and 116 and passes through an appropriate spacer and wear sleeve 124. A wear plate 125 is welded between the vertical hanger plates 115 and 116 and underlies the torque beam 44. By this arrangement the lower beam assembly 45 is immovable with respect to the torque beam 44, other than a slight cushioning movement permitted by the resilient bushing 111.

The axle 26 on its upper portion opposite the lower beam assembly 45, has a wear plate assembly 130 of appropriate hard metal comprising an arcuate base welded to the top of the tag axle 26 and provided with vertical side flanges 131 and 132. This wear plate receives the rear end of the spring assembly 54.

The leaf spring assembly 54 passes through the hanger assembly 60 and its forward end is attached to the shackle assembly 56. This assembly is similar to that shown in my prior U.S. Pat. No. 3,912,294. This comprises the preferred mounting but it will be understood that other forward mountings for the springs 54 may be used and would be required where the invention is not used in tandem or on a tag axle but is used on a drive axle, for example.

The shackle mounting 56 here illustrated, includes an upper U-shaped shackle bracket 136 welded to a lower and inverted U-shaped shackle bracket 137. The V-shaped members 138 and 139 are provided for reinforcement. The upper shackle bracket 136 receives the rear end of the main leaf spring assembly 30 of the forward axle 27, which has one of its leaves turned down at 141. A shackle wear plate 142 is welded between the arms of the bracket 136. Between it and the upper surface of the spring 30 there is a shackle stop 143 having an upturned end 144 at its forward end and a shackle retainer 145 welded across its rear end. Below the spring 30 there is another shackle retainer 148 welded between the sides of the bracket 136 and in a position to be engaged by the downturned hook 141 on the spring 140.

The lower and inverted shackle member 137 that is welded to the upper one has a mounting for the forward end of the spring 54. The spring leaves of the member 54 are bolted together at 150 and by that same bolt are attached to a wear plate 151. The rear end of the wear plate is secured by a clip 152 to the springs. Below the wear plate and welded to it are two shackle retainers 154 and 155 lying fore and aft of the mounting assembly. This mounting assembly includes an outer cylindrical sleeve 156 welded to the retainers 154 and 155, and surrounding a resilient bushing 157 that in turn surrounds an inner bushing 158 mounted on the capscrew 159. The capscrew 159 is supported between the arms of the lower shackle bracket 137.

It will appear that the load is applied from the frame 22 to the hanger assembly 60, to the top of the leaf spring assembly 54, and presses down on the shackle assembly 56, normally maintaining the wear plate against the stop member 144. The stops 145 and 148 prevent disassembly of the shackle from the spring 30. The load is also applied from the frame 22 to the forward pivot of the spring 30, and the spring fulcrums about the axle 27 to apply an upward force onto the shackle assembly 56. For present purposes, the load effect can be considered as the downward load applied through 42 to the middle of the spring 54, as now will be explained.

The two ends of the leaf spring 54 rest upon the tag axle 26 and the shackle 56, respectively. In relieved condition the leaf spring 54 bows upwardly, and at a point between its ends, receives the load of the vehicle through the hanger 42 in the following manner.

The hanger rails 82 and 83 on the inner side of the load bearing assembly 60 support clamp plates 165 on the outside and 166 on the inside in the same manner as the clamping plates 103 and 104 are supported. These clamping plates 165 and 166 receive a bolt 167 that is threaded into the clamping plate 165. Access to the head of this screw is from the inside of the suspension. A sleeve 169 surrounds the setscrew 167 and in turn is surrounded by a resilient bushing 170 around which a further metal wear bushing 171 is mounted. It is to be understood that these parts are cylindrical and concentric with the capscrew 167. Preferably the wear parts are made of metal and the resilient bushing 170 is made of an appropriate rubber-like material.

Thus the load is transmitted from the frame of the vehicle down through the hanger to the bolt assembly of the bolt 167, and to the spring 54. Thence it is transmitted to the shackle 56 and to the tag axle 26. The spring tends to urge the tag axle downwardly, and as was explained in the prior patent, the spring 54 may fulcrum about the center of the capscrew 167 as the vehicle goes over irregular surfaces. The movement of the tag axle is limited by the torque beam 44 to a rocking movement about the capscrew 100. The limiting points of the illustrated suspension are the forward pivot of the spring 30 (not shown) and the pivot 100 of the torque beam 44.

There is a fluid power operated means for positioning the tag axle with respect to movement in one direction, and for resiliently permitting movements of that axle in the opposite direction. This invention is particularly concerned with providing in a single unit the previously described suspension means and the axle-lifting mechanism.

As shown in the drawings, the horizontal plate 61 of the primary parts of the hanger assembly 42 has an extension 174 projecting inwardly. Along the forward edge of this extension 174, a vertical plate 175 is welded. Two transverse frame reinforcing channel beams 177 and 178 are secured to the chassis frames 22, and the vertical plate 175 is also welded to the beam 177. A spacer 179 braces the plate 61 and its extension against the beams 177 and 178. From this plate 175 extend two spaced ears 181 and 182. The foregoing parts for supporting the end of the hydraulic motor typify so-called third portions of the bracket means, hereafter referred to. The ears 181 and 182 are spanned by a capscrew 183 having a lock nut 184 on its other end. The capscrew is a pivot that receives the cylindrical sleeve 185 that is attached to the top of a hydraulic cylinder 186. This cylinder has a hydraulic inlet 187 operating on the top of a piston 188 that is resiliently or spring-urged upwardly against hydraulic pressure.

The lower end of the piston 188 is pivotally connected to a lift beam 190 that is bifurcated at that end. The pivotal arrangement includes a narrow projection 191 on the end of the piston 188 through which a capscrew 192 passes. This capscrew is mounted across the opposite legs of the bifurcated lift beam 190, and has a lock nut 193 on its other end. Spacers 194 are mounted on the capscrew 192 and maintain the proper positioning between the lift arm 190 and the piston 188. The lift beam 190 is pivoted between its ends to constitute the lever of the first class.

As previously noted, the flanges 88 and 89 on the two rails 82 and 83 extend inwardly a distance beyond the angular braces 93 and 94, and on their inner portions have a clamping block 205 welded to them. FIG. 2 shows that the extension 174 of the horizontal hanger plate 61 extends inwardly to overlie the lifting beam 190. At its inner end two flanged rails 210 and 211, similar to the rails 82 and 83, their flanges extending inwardly, have reinforcing ribs or bars 212 and 213, respectively, projecting inwardly therefrom and supporting a clamping plate 214 welded to them. These portions mounted on and depending from the primary parts of the bracket typify second depending portions provided for the pivotal or rocking support of the lift beam 190. A capscrew pivot 220 is mounted through the clamping plates 205 and 214. It receives a bushing 221 onto which the lifting arm 190 is rockably mounted.

The rear end of the lift arm 190, as shown in FIGS. 2 and 4 particularly, receives the pivot pin 225 onto which a dual link 226 is rockably mounted. The lower end of this shackle-link combination 226 is rockably mounted on a pin 227 supported in an axle bracket 228 projecting from and welded to the tag axle 26. The reinforcing plate 229 strengthens this mounting.

FIG. 9 shows a typical control arrangement for this assembly. FIG. 9 shows two cylinders 186, one for each end of the axle or each side of the vehicle. Each of these cylinders has a piston 188 connected as indicated in other drawings, and each has a hydraulic tube 187 connected to it. The tubes 187 are supplied from a pump line 238 connected from an electric motor pump 239. A pressure gauge 240 is also connected into the line 238.

The pump 239 driven by an electric motor is energized from a battery 241. A three-way switch 242 controls the operation of the motor and pump 239. The switch 242 can be in a mid-position in which the pump is deenergized. It can be in a left-hand position as illustrated in FIG. 9 to operate the pump to supply pressure in one direction and it can be moved to the opposite direction to cause the pump to move oppositely. The two directions of movement of the pump supply pressure to line 238 or withdraw it from that line. When the pump is stopped, the hydraulic fluid is trapped in the line and in the cylinders 186, to maintain the piston and connection mechanism in the particular positions occupied at the time the pump was stopped.

If desired, the hydraulic system may be double-acting with an accumulator as shown in copending application Ser. No. 719,286, filed Aug. 31, 1976.

INSTALLATION

The particular feature of the present invention is that it combines two inter-operating mechanisms together so that they can be sold as a kit and installed as a unit. In fact, they can be installed without having to work under the truck. Formerly the tag axle suspension constituted one unit, and the hydraulic axle lift was a separate unit, usually attached at a distance from the tag axle suspension.

If the cross beams 177 and 178 are not already present, they can be bolted into place in the manner indicated in the drawings, or in other suitable fashion. The shackle assembly 56 can be mounted onto the end of the spring 30.

A unitary bracket sub-assembly consisting primarily of the hanger 42, and parts welded thereto, is supplied. This includes the horizontal plate 61, the vertical plate 62, the vertical rails 66 and 67 with the clamping blocks 103 and 104, and clamping blocks 165 and 166 attached to them, the other vertical rails 82 and 83 with their clamping blocks 104 and 166, and the backwardly-extending ribs 88 and 89 with the clamping block 205 welded thereto, the rails 210 and 211 with the clamping block 214 welded to them, and the vertical plate 175 and bracket ears 185 and 182. This unitary assembly also includes the angular braces 93 and 94 and the various gussets.

The kit may include the pre-assembly of the axle suspension and spring means. The bolt 167, with its associated parts constituting a spring seat is put in place to be adjustable vertically in the slot 74. The bolt 100 likewise is put in place along with the parts constituting a support for the forward end of the torque beam 44. Usually the torque beam will be pre-assembled thereto, and the lower torque beam assembly 45 is pre-attached to the torque beam, although it at that time is not welded to the axle 26. The saddles in the two plates 115 and 116 are selected or formed to receive the axle 26 and to dispose it for contact with the members 117 and 118. This has required the insertion of the cross head 110 prior to welding the plates 122 and 125 in place onto the vertical plates 115 and 116.

As a part of this unit of the kit, and axle lift mechanism is also pre-assembled to the foregoing parts. The cylinder 186 is attached at its top by the bolts 184 between the brackets 181 and 182. The spacer 185 provides for the free rocking movement of the top of this cylinder. The lower end of the cylinder in the extension 191 of the piston 188 is pre-assembled by the bolt 192 to the lift beam 190. This in turn is connected by the bolt 220 to the extension 174 of the horizontal supporting plate 61, in such a manner to permit free rocking movement. The two components of the double link 226 are pivotally attached to 225 to the rear end of the lift beam 190. The bracket arms 228 connected by the plate 229 may be pre-connected onto the pin 227 to be supported by the links 226 and available to be mounted upon the plate 61.

The shackle assembly 56 and the spring 54 are supplied at the same time. The shackle assembly 56 is normally delivered with the spring connected to it by the bolt 150 and the clip 152. As noted, and as also present in the prior patent heretofore referred to, the spring 54 has different holes to receive the bolt 150 for adjusting the length of the spring. The bolt 150 may be removed to change the length at the time of installation. The third member of the kit is the control mechanism with the electric motor pump using the necessary electrical wires.

To install the kit, the frame 22 on each side is drilled to receive the bolts 63 and the bracket assembly on the plate 61 is then bolted to the frame at the appropriate place to dispose the axle 26. The reinforcing cross beams 177 and 178 are also put in place. The foregoing is done in a manner to put the lower torque arm assembly 45 in position to receive the axle 26 and to provide the appropriate position to receive the bracket 228 for the axle lift link 226. The only other change required in the initial vehicle assembly is the removal of the conventional shackle on the spring 30 and the installation of the shackle assembly 56 in the manner heretofore explained in the prior patent. The spring 54 is then passed through the hanger 60 beneath the bolt 167 and its assembly, and is disposed over the axle 26 with the wear plate 130 interposed between them. The wear plate may be welded to the axle 26 in advance of the engagement of the spring 54 but the advantage of doing it afterward is that the spring 54 can automatically align the wear plate, which then may be welded to the axle.

The bolt 100 can be turned to adjust the height of the forward or upper end of the torque beam 44 so as to get the opposite sides of the axle precisely even. After it is appropriately adjusted, (and of course these assembly pieces are duplicated on both sides), it is welded in place. When the axle is seated in the hanger 45, it is welded to the hanger, being welded to the plates 115 and 116 and to the plates 117 and 118. Likewise the bolt 167 can be initially positioned either before or after the delivery of the kit and welded into place. This involves a welding of the blocks 165 and 166 in place.

Also, as soon as the plate 61 is bolted into place, the vertical transverse plate 175 can be welded onto the cross beam 177. The lift mechanism is secured to the axle by welding the brackets 228 and 229 to the axle. It is thus apparent that a kit containing three units can be supplied for each side of the vehicle. Not only is the arrangement such that it can be delivered in only three separate units, but also it is very much more compact.

When the equipment is installed, as for example on a tag axle, the control is operated by simply operating the switch 242, assuming the appropriate hydraulic and flexible connections have been made as indicated. The pumping of hydraulic liquid into the cylinder 186 tends to lift the axle 26 and to reduce its share of the load compared to that supported by the driving axle 27. Alternately, withdrawing all of the hydraulic fluid from the cylinder 186 permits the axle 26 to descend and carry a greater proportion of the load.

As is evident, the load is transmitted downwardly from the frame of the vehicle to the two axles. The load on either axle tends to be transmitted to a downward force on the other axle, so that in all cases the load on the frame of the vehicle is transmitted to both axles, even though the load is unevenly disposed along the bed of the vehicle. However, the adjustment of the hydraulic mechanism can alter the loading of the respective axles to get the appropriate distribution.

The spring support for the tag axle is primarily the leaf spring 54. Normally the spring tends to return the hydraulic piston in the cylinder 186 and is of relatively low power and hence can be discounted in comparison with the leaf spring assembly. In my co-pending application Ser. No. 719,286, filed Aug. 31, 1976, referred to, the hydraulic cylinder is double-acting with the pressure charged accumulator so that the hydraulic cylinder can contribute to the spring support effect. This arrangement may be used with the present equipment.

Various changes and modifications may be made within this invention as will be readily apparent to those skilled in the art. Such changes and modifications are within the scope and teaching of this invention as defined by the claims appended hereto.

What is claimed is:

1. In a hanger assembly for attachment to the frame of a vehicle, a unitary bracket means having primary parts engageable with a vehicle frame to connect the assembly to and suspend it from the vehicle frame, the bracket means having first depending portions fixed to the primary parts for rockably receiving a torque beam below the frame that is attachable to an axle, second depending portions of the bracket means fixed to the primary parts beside the first depending portions for mounting of a lift beam lever thereon that is also adapted to be connected to the axle; the bracket means having third portions fixed to the primary parts, having means for attachment of a hydraulic cylinder, the third portions being positioned in proximity to the second depending portions, to provide a mounting for a hydraulic cylinder in position to operate the lift beam lever.

2. In the assembly of claim 1: a torque beam rockably mounted on the first depending portions of the bracket means, and means attached to the torque beam for attachment to the axle.

3. In the assembly of claim 1: spring seat means on the first depending portions of the bracket means.

4. In the assembly of claim 1: a lift beam rockably mounted on the second depending portions of the bracket means; means to connect the lift means to the axle; and a hydraulic cylinder connected to the lift beam and to the third portions of the bracket means.

5. In the assembly of claim 1: the first depending portions having a space to receive a leaf spring passed under the spring seat, a leaf spring passing therethrough, adapted to overlie the axle and to extend at its other end beyond the bracket means on the side thereof opposite to the axle; and means for connecting the said other end of the spring to the vehicle.

6. In the assembly of claim 1: the primary parts including a plate, the first and second depending portions being both secured to the plate, and being substantially side by side, one inside of the other, with respect to the vehicle.

7. In the assembly of claim 4: the lift beam extending from ahead of the second depending portions to behind the same, to be a lever of the first class by its pivotal connection to the second depending portions, and a torque beam pivotally mounted on the first depending portions and extending rearwardly therefrom alongside the lift beam.

8. In the assembly of claim 1: the primary parts including a horizontal plate, the first and second depending portions comprising three pairs of rails depending from and secured to the plate; the pairs being generally aligned transversely of the vehicle; connections for the torque beam extending from the first to the second pair, and means for mounting the lift beam extending from the second pair to the third pair.

9. In the assembly of claim 8: the horizontal plate having a vertical extension rising therefrom; a hydraulic motor attached at its upper end to the extension; and a lift beam connected to the aforesaid mounting means therefor, and to the lower end of the hydraulic motor.

10. In an axle suspension: bracket means attachable to a frame of a vehicle; a torque beam pivoted to the bracket means with an end extending therefrom, means for attaching said torque beam to an axle; a lift beam pivotally connected to the bracket means beside the torque beam; and means to connect the lift beam to the axle alongside the means for attaching the torque beam to the axle; the lift beam being pivotable in a plane parallel to the pivoting of the torque beam.

11. In the suspension of claim 10: power means connected to the lift beam and the bracket means for operating the lift beam.

12. In an axle suspension: a bracket having a horizontal plate for attachment to the side frame of a vehicle; a longitudinal vertical plate united with the horizontal plate, to lie alongside the side frame, the horizontal plate extending both inwardly and outwardly from the bottom edge of the vertical plate; a first depending portion comprising two pairs of vertical rails attached at their upper ends to the underside of the horizontal plate, each pair comprising two longitudinally disposed, separated rails, the first pair of such rails being spaced outwardly from the second, relative to the vehicle frame, but in transverse alignment with the first pair; clamping plates joining the rails of each pair; a pivot pin extending between the plates of the two pairs to support the ends of a torque arm; a torque arm rockably mounted on the pivot pin; a second depending portion comprising a third pair of rails depending from the inward extension of the horizontal plate spaced inwardly from the second pin; clamping plates between the two rails of the second and third pair of rails, a pivot pin supported between said plates; a lift beam rockably mounted on the pivot pin and disposed to rock in a plane parallel to and inwardly of the torque arm; a second vertical plate transversely of the first-named vertical plate, a pair of ears projecting therefrom and a pivot pin spanning between them, they being spaced inwardly relative to the vehicle to dispose their pivot pin inwardly of the vehicle frame; a hydraulic motor supported at one end on the pivot pin spanning the pair of ears and rockably connected at its other end to the lift lever; connecting means for attaching the torque arm to an axle; connecting means for attaching the lift lever to an axle; one of said connecting means incorporating linkage to accommodate movement of the axle other than arcuately about its fulcrum.

* * * * *